Patented Oct. 13, 1931

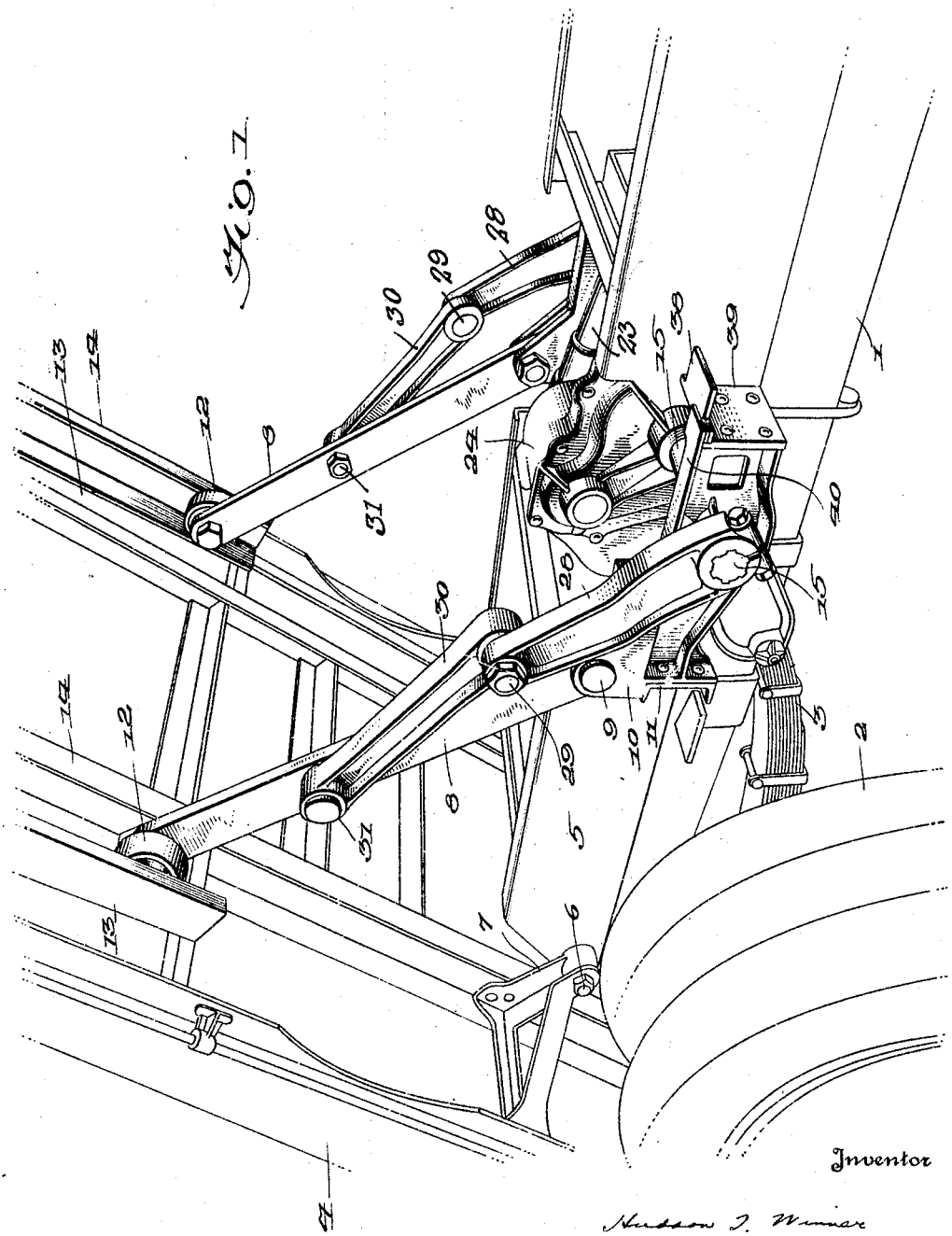

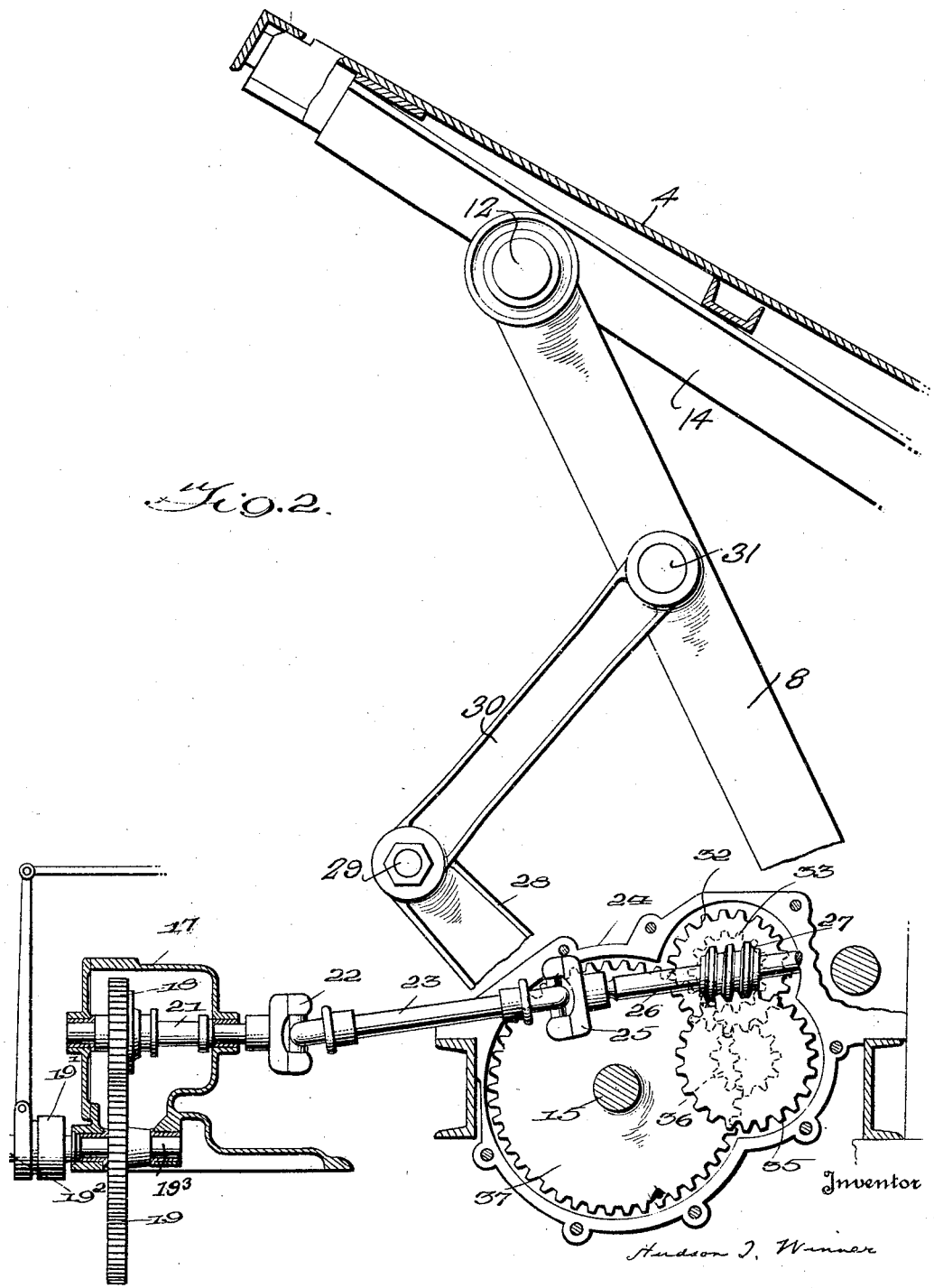

1,826,973

UNITED STATES PATENT OFFICE

HUDSON T. WINNER, OF TRENTON, NEW JERSEY

HOISTING TRUCK

Application filed June 13, 1929. Serial No. 370,609.

The present invention relates to certain improvements in that type of dumping truck having its body pivoted at the rear of the vehicle frame, so that, when the body is tilted, the load carried thereby will be discharged from the rear and the object of the invention is to provide a simple and effective mechanism for swinging the body to and from tilted relation.

The invention is illustrated in the accompanying drawings, in which:

Fig. 1 is a fragmentary perspective view of portions of the truck and the means for rocking the body on its pivots.

Fig. 2 is a fragmentary side elevation, partly in section.

Referring to the drawings, 1 indicates the vehicle frame or chassis provided with the usual suspension springs 3 and traction wheels 2. The truck body 4, which normally lies flat on the chassis 1, is pivotally connected to the rear portion of said chassis by means of brackets 7 secured to the under side of the body and pintles 6 passing through registering eyes in the brackets and holes in the side sills of the chassis, as clearly shown in Fig. 1. Secured to the outer faces of the side sills of the frame or chassis 1, by means of cross members 11 and 39, are composite brackets 10, which carry the principal elements of the operating gear for swinging the body on its pivotal supports to and from tilted position.

Pivotally supported at their lower ends on pintles 9 engaging the respective brackets 10 are levers 8, 8, the outer or free ends of which are provided with rollers 12, 12, which normally engage the under face of the body and are guided by parallel rails 13 and 14 on the body.

Journaled in bearings formed in the brackets 10, 10 is a transverse shaft 15, the ends of which extend beyond the outer faces of the brackets and have rigidly secured thereto crank arms 28, 28, the outer ends of which are connected to the respective levers 8 by links 30, which are pinned to the crank arms 28 and levers 8 by pintles 29 and 31, respectively, the pivotal connections between the links and the levers being disposed at points beyond the middle of the levers and toward the free ends of the latter.

Partial rotation of the shaft 15, in an anti-clockwise direction, when the body 4 is resting in normal position on the frame of the chassis, will swing the crank arms 28 in the same direction and, through connecting links 30, 30, will swing the levers 8, 8 upwardly and rearwardly, causing the free ends of the levers to swing the body upwardly and rearwardly on its pivotal connections at the rear of the chassis to any desired degree of inclination necessary to discharge the load carried by the body. The partial rotation of the shaft in an opposite direction, after the load has been discharged, will cause the levers 8, 8 to be swung forwardly and downwardly by the connecting lever 30 and crank arms 28 until the body again rests on the chassis.

Preferably, the shaft 15 is driven by special gear connections from the engine or motor, which drives the truck and, as the truck drive includes suitable reversing mechanism, the rotation of the shaft 15 in either direction may be controlled by properly operating said reversing mechanism. A suitable form of mechanism for driving shaft 15 is illustrated in Fig. 2, in which $19^2$ is a stub shaft connected with the reversing gear of the truck engine and, therefore, capable of being rotated in either direction by appropriate adjustment of the reversing gear. The shaft $19^2$ is adapted to be connected to a second stub shaft $19^3$ by a clutch 19'. The shaft $19^3$ is journaled in a housing 17 mounted on the chassis and fast to said shaft is a gear 19, which meshes with a gear 18 fast to shaft 21 journaled in the housing 17, the outboard end of the shaft 21 being coupled by a universal joint 22 with an intermediate shaft 23, which, in turn, is connected by a universal joint 25 to shaft 26 journaled in the gear casing or housing 24 mounted on the chassis, said shaft 26 having a worm 27 fast thereon, which meshes with a worm gear 35 journaled in the casing, to one face of which is secured a smaller gear 36 meshing with a larger gear 32 to one face of which or to the shaft thereof is fixed a smaller gear 33, which meshes with large gear 37 fast on shaft 15. This organization constitutes a reducing gear which enables the truck body and the load carried thereby to be tilted with a minimum expenditure of truck body and the load carried thereby to be tilted with a minimum expenditure of energy from the engine which operates the truck, and, by reason of the worm drive interposed in the gear train, it will be apparent that the body may be tilted at any desired angle and held there, as the worm gear prevents any automatic reversal of the gear train under the load imposed by the truck body and its contents.

In order to support the levers 8 and the links 9 in horizontal relation, when the body of the truck is in lowered position, each of the brackets 10 is provided with flat upper surfaces 38 and 40, respectively, which are engaged by the levers 8 and the links 30, thereby insuring the outer ends of the levers 8 being retained in proper operative engagement with the bottom of the body 4, when the body is in lowered position.

The provision of the brackets 10, which constitute the journal bearings for the shaft 15 and the pivotal supports for the levers 8, greatly simplifies the construction and operation of trucks of this character and the particular arrangement of the pivotal points of the levers 8 in relatively close association with the drive shaft 15, and the connection of the links 30 toward the forward ends of the levers 8 insures an efficient operation of the tilting mechanism with a minimum expenditure of engine power.

What I claim is:

In a dump truck having its body pivoted at the rear of the vehicle frame, means for swinging the body to and from tilted relation comprising a shaft extending transversely of the frame, brackets secured to the side members of the frame and having bearings for said shaft, crank arms fixed to the ends of the shaft, levers pivoted to said brackets and having their free ends engaging the under side of the body, links connecting the crank arms with the respective levers intermediate the length of said levers, and means including reducing gearing for operating said shaft, said brackets having top surface portions to support the respective links and levers when the body is in lowered position.

In testimony whereof I affix my signature.

HUDSON T. WINNER.